April 8, 1930.  W. S. BOWEN  1,753,915
SPRAY DRYING APPARATUS
Filed June 5, 1929  2 Sheets-Sheet 1
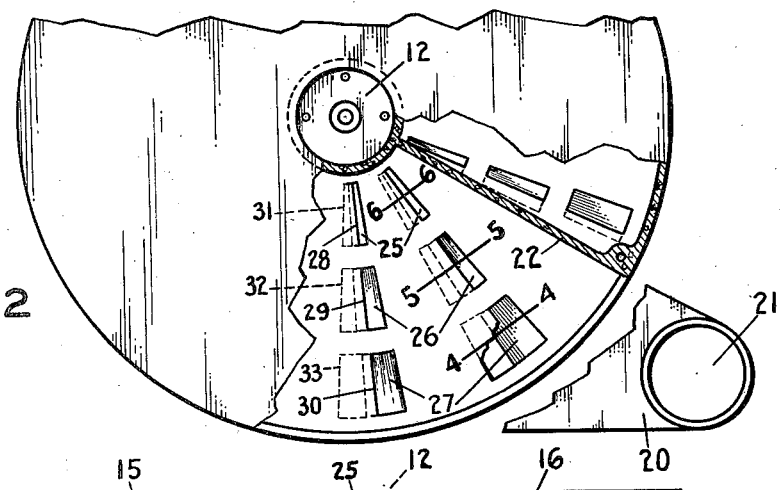
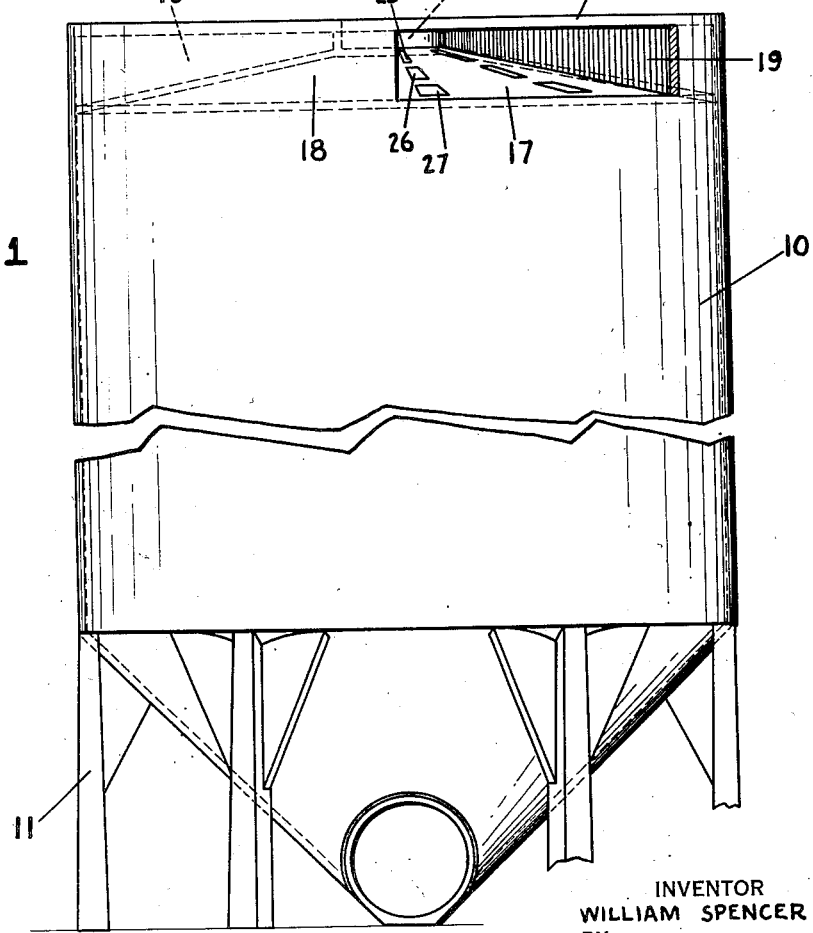
INVENTOR
WILLIAM SPENCER BOWEN
BY
*Fred L. F. Schuck*
ATTORNEY April 8, 1930.    W. S. BOWEN    1,753,915
SPRAY DRYING APPARATUS
Filed June 5, 1929    2 Sheets-Sheet 2

INVENTOR
WILLIAM SPENCER BOWEN
BY
ATTORNEY

Patented Apr. 8, 1930

1,753,915

UNITED STATES PATENT OFFICE

WILLIAM SPENCER BOWEN, OF WESTFIELD, NEW JERSEY

SPRAY-DRYING APPARATUS

Application filed June 5, 1929. Serial No. 368,602.

The invention relates to desiccation apparatus and more especially to apparatus of the type wherein a solid-containing liquid is directed into a tower or like chamber in finely divided state and subjected therein to an atmosphere of a gaseous drying medium. The solid-containing liquid, emulsion, or slurry is introduced usually through a central opening in the top of such tower or chamber by means of a suitable spray-nozzle or other disintegrating device for providing the same in finely divided state in the interior of the chamber; and the current of gaseous drying medium is then introduced either concurrently or counter-currently therewith and about the spray.

The present invention is concerned more especially with the arrangement wherein the flow of the two media is concurrent; and it has for its object a novel construction of the head or top of the tower whereby the gaseous drying medium may be more effectively introduced into the drying chamber to provide for a better and more rapid drying of the material contained in the liquid as a solution, suspension or slurry thereof. A further object of the invention resides in the construction whereby a more satisfactory distribution of the incoming gaseous medium is attained in affording a plurality of streams thereof and whereby the same is introduced in a manner such that the direction of the different incoming streams varies in relation to the longitudinal axis of the chamber, being more nearly parallel therewith at the center and diverging therefrom toward the circumference of the chamber. This results in a confining action upon the resulting dried particles which tends to prevent their reaching the inner face of the chamber wall where there is frequently a tendency for the particles to adhere; and will impart to the core of drying particles a swirling motion.

In carrying out the invention, the top of the tower is provided with a gaseous medium inlet chamber surrounding, for example, a centrally disposed inlet for the solid-containing liquid; and said gaseous medium inlet chamber has a base, which is preferably conically disposed therein, and horizontal top. A radially disposed intermediate wall or partition is also provided between said base and top to distribute the incoming gaseous medium circularly throughout the chamber, said medium being preferably introduced substantially tangentially thereto through a suitable circumferential inlet opening. The base of the gaseous medium chamber, moreover, is, preferably, of appreciable thickness and provided with circularly arranged and radially disposed inlet ports to the desiccating chamber, the entrance edge of each of a set of radially disposed ports lying, for example, in the same radius and the corresponding exit edge or edges lying in a radius displaced therefrom; or, the two said edges may merely be angularly displaced relatively to each other.

By this expedient, a port nearest the center of the base will have a sharper pitch than a port more removed therefrom. In other words, the incoming streams or jets of air passing through the more centrally located ports will be more nearly directed vertically with respect to the incoming spray of finely divided liquid-containing material and will tend to confine thereby the drying material centrally rather than permit it to spread outwardly toward the inner face of the side wall. The said ports, moreover, are tangentially directed into the chamber and will effect a swirl or spiral motion throughout the same of the gaseous medium for effectively intermingling with the small particles of solid-containing liquid and effect a rapid desiccation thereof, as well as to sweep from the inner side walls of the chamber any particles which might reach the same and tend to adhere thereto.

Of course, if the bottom wall of the inlet chamber were merely in the nature of a thin sheet, the inclination of said ports aforesaid would disappear but could be substituted for by suitably inclined short tubes or duct-affording members.

By inclining the base of the gaseous medium inlet chamber toward the horizontal top, a proportionately less volume of drying gaseous medium is supplied at the central portion of the gaseous medium supplying chamber, which volume also increases proportionately outwardly in accordance with the requirements of the ports, which, preferably, are made to increase in capacity outwardly from the center of the tower top. This is desirable because the final stages of drying are really the most difficult to accomplish and the larger quantity of desiccating gaseous medium is then most needed. The incoming streams of gaseous medium entering therein through the ports also have a radial component directed toward the center with this modified form of base.

The nature of the invention, however, will best be understood when described in connection with the accompanying drawings, in which:

Fig. 1 is a front elevation of a desiccating apparatus provided with the novel top for admitting the gaseous medium thereto, and with the liquid-containing disintegrating mechanism removed.

Fig. 2 is a fragmentary plan thereof with a portion of the top broken away to disclose the interior.

Figure 3:
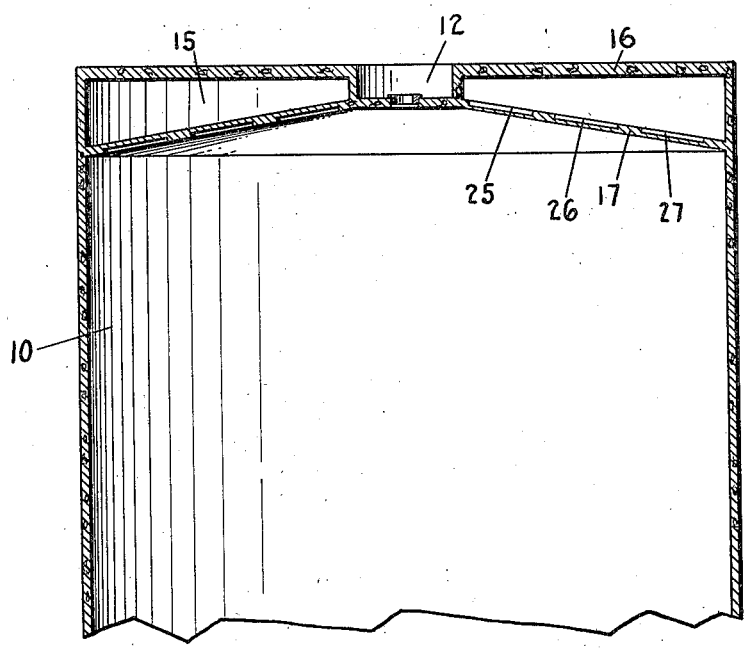
Fig. 3 is a fragmentary vertical section through the tower.
Figure 4:
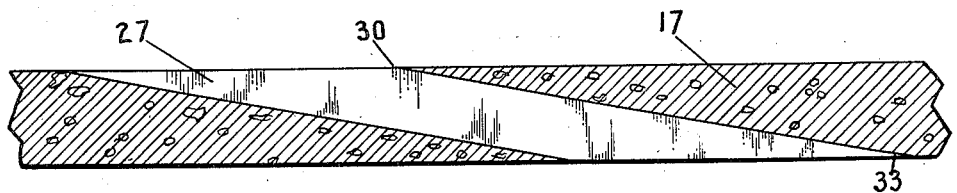
Figure 5:
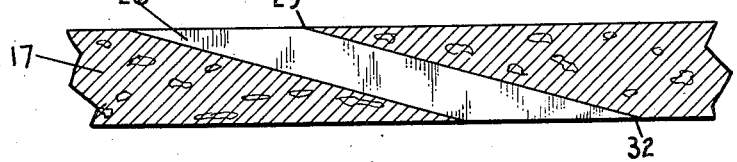
Figure 6:
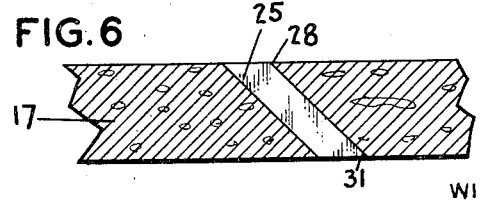

Figs. 4, 5 and 6 are fragmentary transverse sections on an enlarged scale and taken respectively on the lines 4—4, 5—5 and 6—6, Fig. 2 of the drawings.

Referring to the drawings, 10 designates a suitable drying chamber, for example, in the nature of a vertical cylindrical tower; and it is preferred to construct the same of concrete supported upon suitable piers 11. At the top of the tower the same is closed with the exception of an inlet opening 12, preferably centrally disposed therein, and serving for the introduction of the solid-containing liquid which may be effected by any suitable well-known or special spray or disintegrating means (not shown) and serving to deliver the same into the interior of the chamber in a finely divided state so that the solid portion thereof, when dried, will be provided as a fine powder. The latter, which collects in the bottom of the tower, may be removed therefrom in any suitable manner, and all of which is well understood by those skilled in the art.

The invention relates more especially to the manner of introducing the gaseous desiccating medium into the chamber 10; and to this end, the top of said chamber is provided with an inlet chamber 15 which is afforded between the top wall 16 of the chamber 10 and a bottom wall 17 for said inlet chamber and located beneath the same within the chamber 10 to surround the inlet 12 thereof. A side wall 18 of said inlet chamber is cut away for approximately a quadrant to afford a peripheral opening 19 into said inlet chamber and which is covered by a duct 20 for introducing, preferably tangentially, into said inlet chamber the gaseous desiccating medium.

The latter may be derived from any suitable source at the proper temperature and delivered thereto as through a stack 21 in communication with duct 20.

Inlet chamber 15, moreover, is divided into two portions by a vertically disposed partition 22 extending between the top wall 16 and the bottom wall 17, said partition being located at one end of the peripheral opening, so that the incoming gaseous desiccating medium is directed circularly through the chamber 15.

This chamber, furthermore, is provided with a series of ports opening into the chamber 10 through the bottom wall 17; and in accordance with the invention, these ports are arranged circularly in the bottom 17 about the opening 12 and radially outwardly from said opening. For example, a series of ports 25 are arranged circularly immediately about the inlet opening 12, an intermediate set 26 beyond the same, and a further and final set 27 in proximity to the side wall of the gaseous medium inlet chamber. In disposing these ports in the bottom wall of the inlet chamber, the preferred arrangement is such that the different series of ports from the center outwardly increase in angularity the deliveries therethrough with reference to the vertical axis of the chamber 10. For example, one of the edges of each of the ports, as the respective edges 28, 29 and 30 of the ports 25, 26 and 27, lie in the same radius, while the corresponding exit edges 31, 32 and 33 thereof are similarly located at the under surface and angularly displaced therefrom. By this expedient, the inclinations of the respective ducts to the vertical vary with their location from the center outwardly, and thus the innermost duct 25 will direct a stream of incoming gaseous medium more nearly vertically than the outermost duct 27 and due, for example, to the appreciable thickness of the bottom wall 17. Of course, if this wall were very thin as of sheet metal, it would be necessary to provide instead suitable tubes or duct members correspondingly inclined.

This varying inclination of the ducts as they progress outwardly from the center will better maintain the sprayed material entering through inlet 12 to the axial portion of the chamber 10 and prevent the same in any quantity from reaching the side walls of said chamber. Any particles, however, reaching the same will be swept therefrom by the more horizontally directed streams entering the chamber through the outermost ducts 27. The whole arrangement, moreover, makes for a very intimate intermingling of spray and gaseous desiccating medium which is the essence of efficiency in spray-drying operations; and provides for a spiral or swirling action of the mixture through the length of the chamber 10. The novel arrangement also insures ample gaseous desiccating medium at the peripheral portions of the desiccating chamber 10, where the drying operation is the most difficult.

The bottom wall 17 has been shown inclined to the top wall 16 of the inner chamber 15; and it is preferred to thus construct the same to give a further radial and inwardly directed component to the incoming streams of gaseous desiccating medium.

I claim:

1. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially.

2. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially and at different angles relatively to the longitudinal axis of the tower.

3. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially and at different angles relatively to the longitudinal axis of the tower, the angles increasing from the center outwardly.

4. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially, and a dividing partition between the top and bottom walls of said inlet chamber, said chamber having a peripheral opening for receiving a gaseous desiccating medium.

5. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially, a dividing partition between the top and bottom walls of said inlet chamber, said chamber having a peripheral opening for receiving a gaseous desiccating medium, and means to direct a gaseous desiccating medium tangentially into said opening.

6. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top horizontally-disposed wall of the drying chamber, and a relatively thick bottom wall displaced therefrom with the tower, said bottom wall having ports circularly arranged and radially disposed therein to admit a gaseous desiccating medium to the interior of the chamber tangentially.

7. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a relatively thick bottom wall disposed below the same within the tower, the said bottom wall having ports circularly arranged and radially disposed therein to admit a gaseous desiccating medium to the interior of the chamber, an upper edge of each of the corresponding radially disposed ports lying in the same radius and likewise a corresponding bottom edge of the said ports along a radius displaced angularly therefrom.

8. Desiccating apparatus, comprising a tower affording a closed drying chamber provided with an opening at the top for the admission of a solid-containing liquid, an inlet chamber provided at the top of said tower for a gaseous desiccating medium and surrounding the admission opening, and the said inlet chamber being provided by the top wall of the tower and a bottom wall disposed below the same within the tower, the said bottom wall having ports circularly arranged and radially disposed therein to admit a gaseous desiccating medium to the interior of the chamber tangentially, and the cross-sectional area of the respective ports increasing from the center outwardly 9. Desiccating apparatus, comprising a tower affording a closed drying chamber provided with an opening at the top for the admission of a solid-containing liquid, an inlet chamber provided at the top for a gaseous desiccating medium surrounding the admission opening, and the said inlet chamber being provided by the top horizontally-disposed wall of the inlet chamber and a bottom wall displaced therefrom within the tower and inclined to the top wall to provide a gradually reduced volume from the circumference inwardly, said bottom wall having ports circularly arranged and radially disposed therein to admit a gaseous desiccating medium to the interior of the chamber tangentially.

In testimony whereof I affix my signature.

WILLIAM SPENCER BOWEN.